US008670591B2

(12) United States Patent
Mendez-Rodriguez et al.

(10) Patent No.: US 8,670,591 B2
(45) Date of Patent: Mar. 11, 2014

(54) FOLIAGE PENETRATION BASED ON 4D LIDAR DATASETS

(75) Inventors: Javier Mendez-Rodriguez, Gainesville, VA (US); Pedro J. Sanchez-Reyes, Herndon, VA (US); Sol M. Cruz-Rivera, Woodbridge, VA (US); Gabriel Maladonado-Diaz, Centreville, VA (US)

(73) Assignee: Exelis, Inc., McLean, VA (US)

( * ) Notice: Subject to any disclaimer, the term of this patent is extended or adjusted under 35 U.S.C. 154(b) by 180 days.

(21) Appl. No.: 13/409,417

(22) Filed: Mar. 1, 2012

(65) Prior Publication Data

US 2013/0230206 A1 Sep. 5, 2013

(51) Int. Cl.
*G06K 9/00* (2006.01)
*G06T 17/00* (2006.01)

(52) U.S. Cl.
USPC .......................... 382/103; 382/285; 345/424

(58) Field of Classification Search
USPC ......... 382/100, 103, 106, 154–155, 162, 168, 382/173, 181, 199, 203, 209, 232, 254, 274, 382/276, 285, 291, 305, 312; 345/424, 420; 701/45; 356/5.01, 4.01
See application file for complete search history.

(56) References Cited

U.S. PATENT DOCUMENTS

| RE43,722 E * | 10/2012 | Kennedy et al. ............. 356/4.01 |
|---|---|---|
| 8,294,881 B2 * | 10/2012 | Hellickson et al. .......... 356/5.01 |
| 8,379,020 B2 * | 2/2013 | Clifton ......................... 345/424 |
| 2005/0278098 A1 * | 12/2005 | Breed ............................ 701/45 |
| 2008/0238919 A1 * | 10/2008 | Pack .............................. 345/420 |

OTHER PUBLICATIONS

Mendez-Rodriquez, Javier et al.; "Foliage Penetration by Using 4-D Point Cloud Data", Laser Radar Technology and Application, XVII, SPIE, 1000 20 TM St. Bellingham WA, 98225-6705, USA, Vol. 8379, No. 1, May 11, 2012.*
Beer, Mark; EPO Authorized Officer, International Search Report for PCT/US2013/027750, May 15, 2013.
Falkowski, Michael J. et al.; Automated Estimation of Individual Conifer Tree Height and Crown Diameter Via Two-Dimensional Spatial Wavelet Analysis of Lidar Data:, Canadian Journal of Remote Sensing, Apr. 3, 2006, pp. 152-161.
Vu, Thuy T. et al., "Wavelet and Scale-Space Theory in Segmentation of Airborne Laser Scanner Data", Remote Sensing, May 22, 2001, Entire Document.
Elhifnawy, H. et al.; "Wavelet Building Extraction From Lidar Data", Geomantics Technologies in the City, May 10, 2011, Entire Document.
Amagaa, Tsolmon; "Wavelet-Based Analysis for Object Separation From Laser Altimetry Data"; Feb. 17, 2003; Retrieved From the Internet: URL:http://www.itc.eu/library/Papers_2003/msc/gfm/amgaa_tsolmon.pdf.
Mendez-Rodriquez, Javier et al.; "Foliage Penetration by Using 4-D Point Cloud Data", Laser Radar Technology and Application, XVII, SPIE, 1000 20th St. Bellingham WA, 98225-6705, USA, Vol. 8379, No. 1, May 11, 2012.

* cited by examiner

*Primary Examiner* — Seyed Azarian
(74) *Attorney, Agent, or Firm* — RatnerPrestia

(57) ABSTRACT

A method for detecting terrain, through foliage, includes the steps of: receiving point cloud data in a three-dimensional (3D) space from an airborne platform, in which the point cloud data includes foliage that obscures the object; reformatting the point cloud data from the 3D space into a one-dimensional (1D) space to form a 1D signal; and decomposing the 1D signal using a wavelet transform (WT) to form a decomposed WT signal. The decomposed WT signal is reconstructed to form a low-pass filtered profile. The method classifies the low-pass filtered profile as terrain. The terrain includes a natural terrain, or a ground profile.

18 Claims, 17 Drawing Sheets

FOLIAGE PENETRATION BASED ON 4D LIDAR DATASETS

FIELD OF THE INVENTION

The present invention relates, in general, to visualization of point cloud data derived from a light detection and ranging (LIDAR) system. More specifically, the present invention relates to foliage penetration using four dimensional (4D) data from a LIDAR system. The present invention detects obscured targets by removing tree foliage and other vegetation that obfuscate the targets.

BACKGROUND OF THE INVENTION

Three-dimensional (3D) type sensing systems are commonly used to generate 3D images of a location for use in various applications. For example, such 3D images are used for creating a safe training environment for military operations or civilian activities; for generating topographical maps; or for surveillance of a location. Such sensing systems typically operate by capturing elevation data associated with the location of the target. One example of a 3D type sensing system is a Light Detection and Ranging (LIDAR) system. The LIDAR type 3D sensing systems generate data by recording multiple range echoes from a single pulse of light and generating a frame, sometimes referred to as an image frame. Accordingly, each image frame of LIDAR data includes a collection of points in three dimensions (3D point cloud), which correspond to multiple range echoes within a sensor's aperture. These points can be organized into "voxels" which represent values on a regular grid in a three dimensional space. Voxels used in 3D imaging are analogous to pixels used in the context of 2D imaging devices. These frames can be processed to reconstruct a 3D image of the location of the target. In this regard, each point in the 3D point cloud has an individual x, y and z value, representing the actual surface within the scene in 3D.

A three dimensional (3D) point cloud is a dataset composed of spatial measurement of positions in 3D space (x, y, z), where x and y are cross-range spatial positions and z is height. The 3D data is generated by systems capable of scanning surfaces, such as stereo paired cameras, radars, laser detection and ranging (LADAR) sensors, etc. Point cloud visualization, in general, is of great interest within the defense and geospatial community.

Advances in LADAR systems have been pushing towards 4D data (x, y, z and time, t). These systems are capable of operating in the same way as a video camera operates, at 30 frames per second. Sampling a scene in a 4D domain is very attractive in military and civilian applications. As will be explained, the present invention uses 4D measurements recorded by a LADAR system to generate 3D video.

SUMMARY OF THE INVENTION

To meet this and other needs, and in view of its purposes, the present invention provides a method for detecting a terrain profile using point cloud data. The method includes the steps of:
- (a) receiving point cloud data in a three-dimensional (3D) space from an airborne platform;
- (b) reformatting the point cloud data from the 3D space into a one-dimensional (1D) space to form a 1D signal;
- (c) decomposing the 1D signal using a wavelet transform (WT) to form a decomposed WT signal;
- (d) reconstructing the decomposed WT signal to form a low-pass filtered profile; and
- (e) classifying the low-pass filtered profile as the terrain profile.

The method may include the steps of:
- (f) forming a height signal using the 1D signal; and
- (g) classifying a height point of the height signal as a point of an object, if the height point is above a corresponding point of the low-pass filtered profile. The object includes a man-made object or vegetation disposed above the terrain profile. The terrain profile includes a natural terrain profile, or a ground profile.

Receiving the point cloud data includes: receiving x, y, z data from a laser detection and ranging (LADAR) system. The x and y data are imaging data in the x and y directions of an imaging array, respectively, and z data is intensity data in the z direction of the imaging array.

The method reformats the point cloud data by:
- (a) dividing the imaging data into a plurality of dx strips, in which each dx strip is a narrow delta in the x direction of the imaging array, and
- (b) forming the 1D signal as z data in each of the plurality of dx strips.

The z data is formed by moving, sequentially, in an ascending order of the y direction and a descending order of the y direction as a function of each consecutive dx strip in the x direction.

Decomposing the 1D signal includes:
- (a) calculating approximation coefficients (aC) for the 1D signal, and
- (b) calculating detail coefficients (dC) for the 1D signal.

Reconstructing the decomposed WT signal includes:
- (a) setting the detail coefficients (dC) to zero, and
- (b) calculating an inverse transform ($W^{-1}$) of the WT, after setting the detail coefficients (dC) to zero, to form the low-pass filtered profile.

The decomposing step includes calculating at least three levels of aC and dC, and the reconstructing step includes setting the at least three levels of dC to zero. The method then synthesizes the at least three levels of aC to form the low-pass filtered profile.

The method may include the steps of:
- (a) reconstructing the decomposed WT signal to form a high-pass filtered profile; and
- (b) classifying the high-pass filtered profile as discontinuities in the terrain profile. The discontinuities denote edges of man-made structures.

Decomposing the 1D signal includes:
calculating approximation coefficients (aC) for the 1D signal, and
calculating detail coefficients (dC) for the 1D signal.
Reconstructing the decomposed WT signal includes:
setting the approximation coefficients (aC) to zero, and
calculating an inverse transform ($W^{-1}$) of the WT, after setting the approximation coefficients (aC) to zero, to form the high-pass filtered profile.

It is understood that the foregoing general description and the following detailed description are exemplary, but are not restrictive of the invention.

BRIEF DESCRIPTION OF THE FIGURES

The invention is best understood from the following detailed description when read in connection with the accompanying figures, with like elements having the same reference numerals. When pluralities of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

The present invention provides, among other features, foliage penetration based on four dimensional (4D) point cloud data. As will be explained, the present invention processes point cloud data, in the x, y, z format, which are obtained from a LADAR, or LIDAR system, to detect and track the bare earth and edge structures. Obscured targets under forest areas are detected and tracked by the present invention by removing and filtering vegetation and other objects that obfuscate the real targets of interest. The processing is done in real-time.

Figure 1:
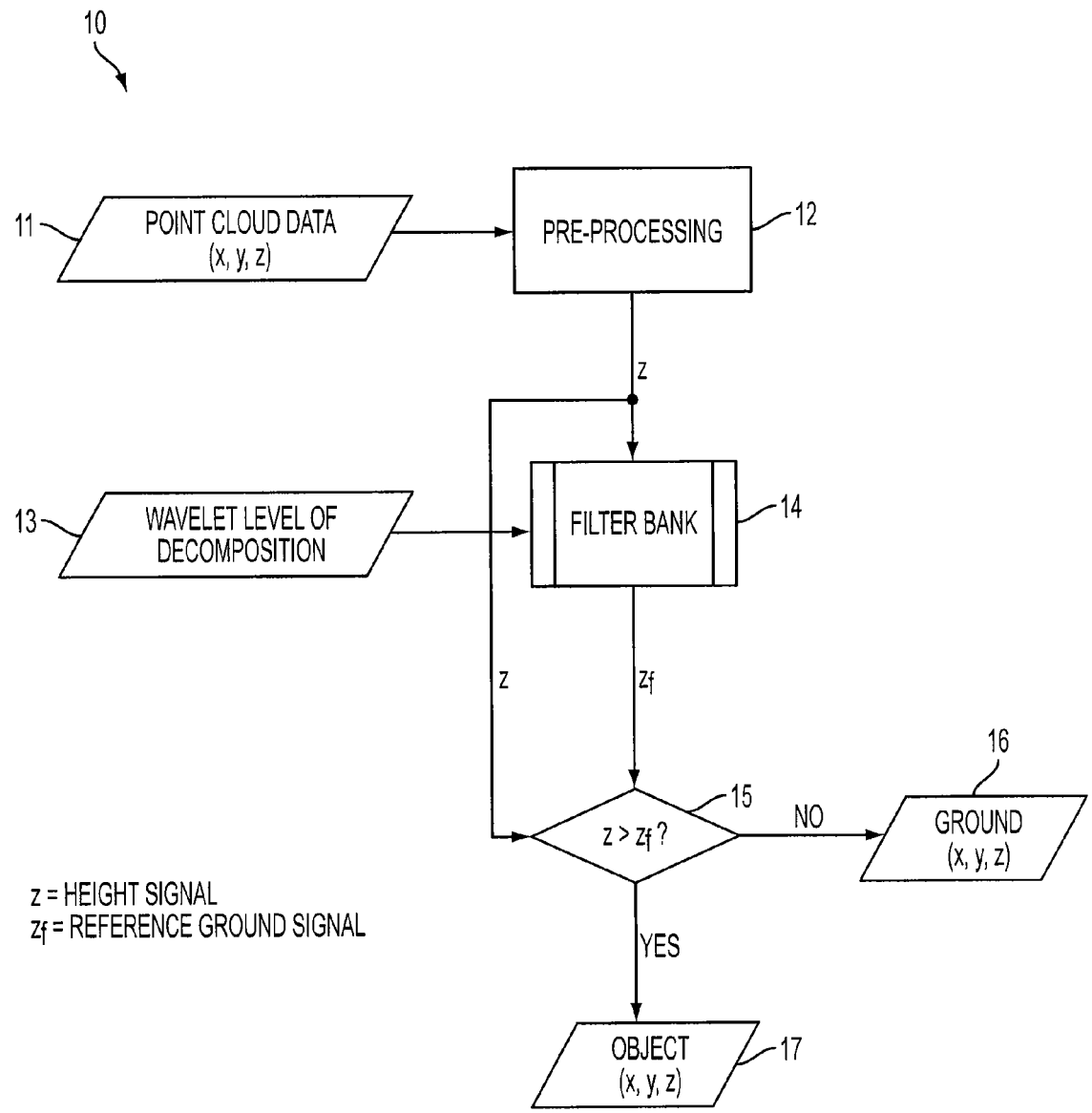
FIG. 1 is a flow diagram of a bare earth extraction (BEE) method, in accordance with an embodiment of the present invention.

The LADAR system provides 3D data (x, y, z) as a function of time (t). This data is processed in real-time by the present invention, as shown in FIG. 1. As shown, a bare earth extraction (BEE) method, generally designated as 10, includes processing step 12 which processes point cloud data 11. The processed data is filtered by filter bank 14, which also receives decomposed wavelet data 13. The filter bank provides height data (z) to decision block 15, which separates ground data 16 from object data 17. The method 10 will now be described in greater detail below. In order to process the data, the data are re-organized. The present invention chooses to organize the data in a one-dimensional (1D) profile line style. First, the ordering algorithm looks for a minimum and maximum values of the entire x range of the data. The 3D point cloud data are then divided into m 2D column profiles across the x dimension of the form x(y,z) using previous knowledge of the average point spacing (see FIGS. 2A and 2B). If no previous knowledge of the data exists, then the data is binned into the 2D columns assuming a very narrow point spacing along the x dimension of dx. If no points are culled into a column, the column is discarded. Because of the intrinsic geometry of some data collections, one point column may occur and it is not discarded. Though this may happen rarely (an example is a diamond shaped collection), the algorithm retains the information, so as not to discard any information at this point, and, thereby, minimize the errors.

Figure 2A:
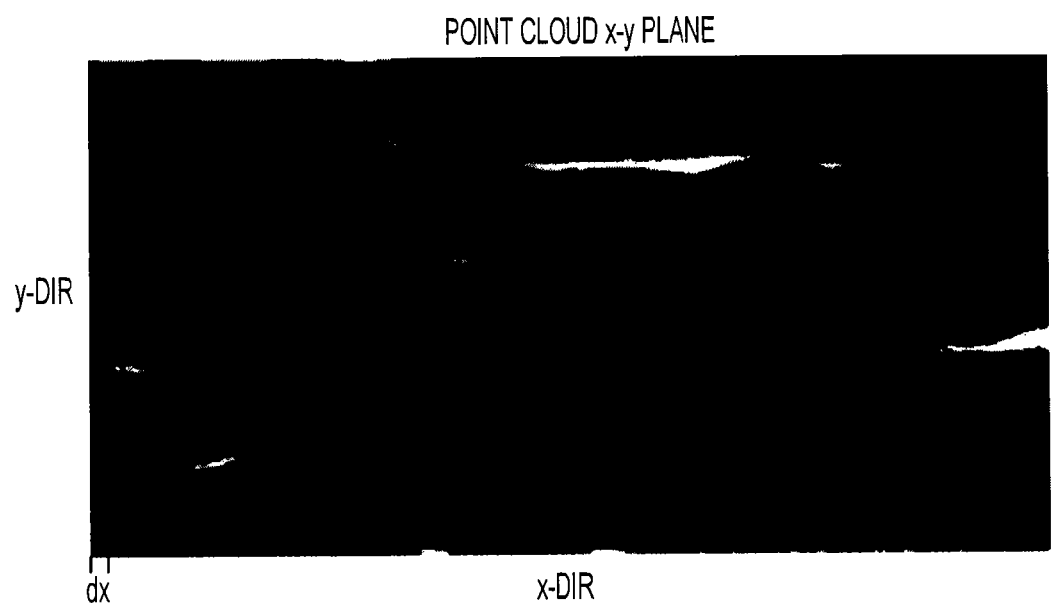
FIG. 2A is an x, y plane of point cloud data.
Figure 2B:
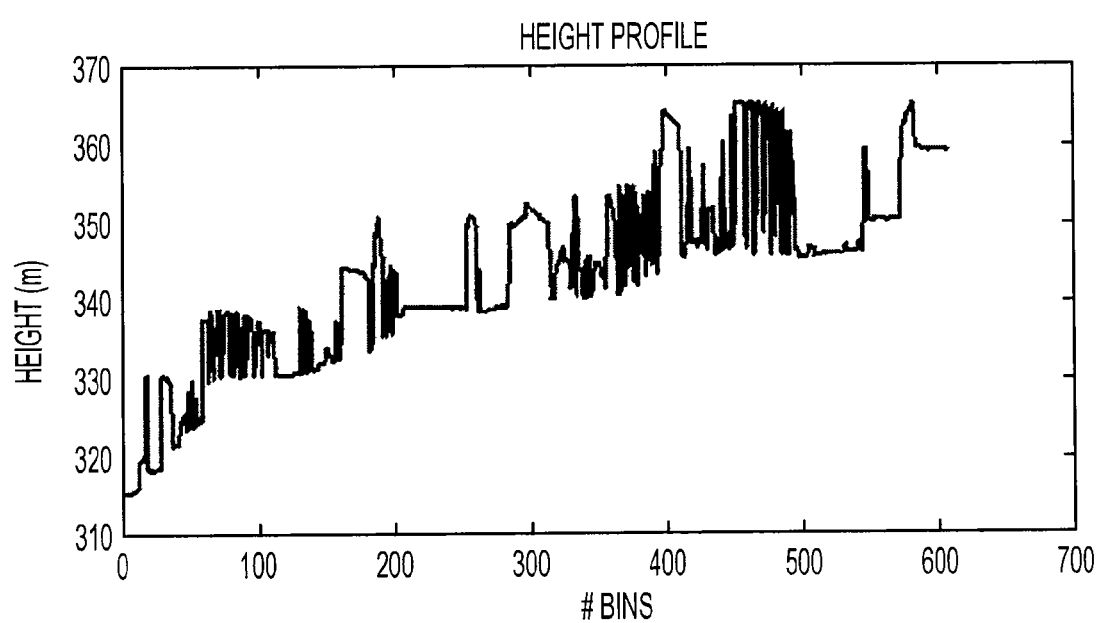
FIG. 2B is a height profile in the z-direction of the point cloud data shown in FIG. 2A.
Figure 3:
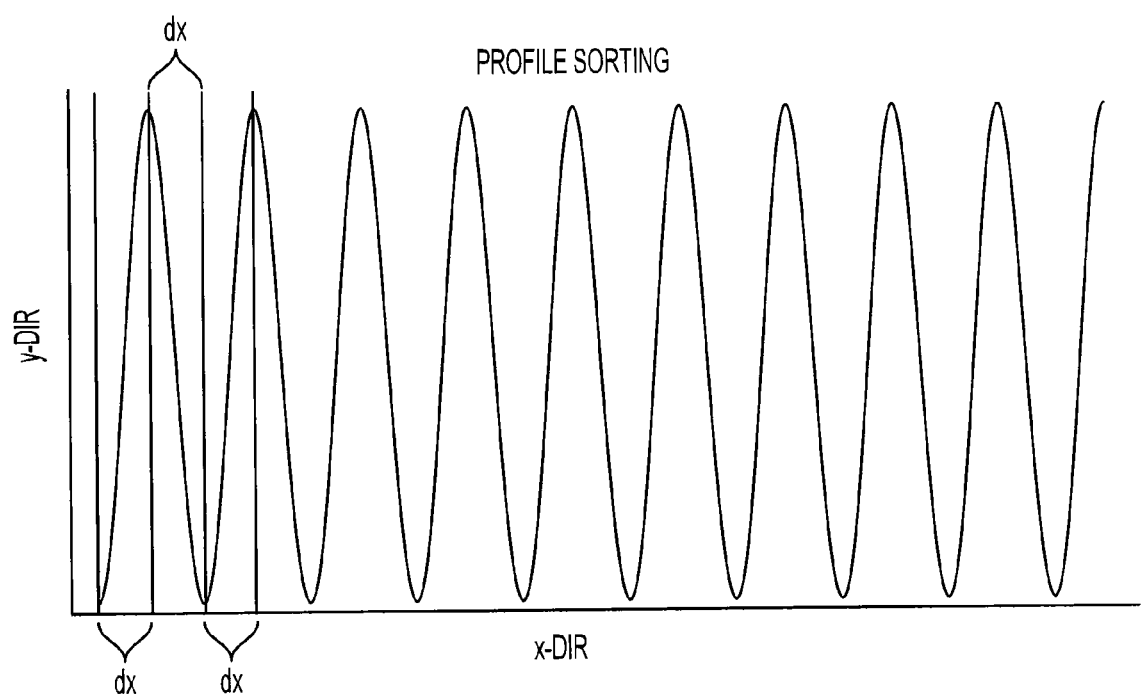
FIG. 3 is an exemplary ordering sequence for sorting the x, y, z data of a point cloud, in accordance with an embodiment of the present invention.

It will be appreciated that FIG. 2A presents the x-y plane of point cloud data, where x and y are the positions of each detected object. The data ordering algorithm uses a very narrow constant (dx) to organize the data in function of x(y, z). Once the position values across y are detected, the algorithm proceeds to find the respective values in z as shown in FIG. 2B. To avoid an increase in computational complexity, the present invention merges the column profiles to form a single 2D column. In order to reduce the errors in the single 2D column processing, the present invention chooses to alternate the ordering between ascending and descending sorting along the y dimension across the 2D columns, as shown in FIG. 3. The advantage of this approach is that merging the profiles results in smooth unions between the column profiles. This is because the end point of an ascending ordered column and the initial point of the following ordered column (i.e. a descending ordered column) are coalescent points, and neighboring points likely have similar heights. This also helps minimize the error of columns with few points. If the number of elements in the column is not a multiple of $2^L$, were L is the wavelet level of the decomposition. The data is padded up to a multiple of $2^L$ by using a symmetrical padding of the last $2^L$-N points in the single 2D column, where N is the total number of points in the single un-padded 2D column.

It will be appreciated that the first "dx" shown in FIG. 3, from left to right, corresponds to a first profile in ascending order of y, and the second "dx" corresponds to a second profile in descending order of y, and so on. Since the data is uniformly sampled by one unit distance, the present invention is advantageously able to view the single column as a function of time and height (z dimension) instead of position and height. The new column is a one dimensional collection in time with height attributes. This one dimensional profile is the output of the ordering algorithm performed by processing step 12 shown in FIG. 1. Accordingly, the present invention uses 1D height profiles to tackle the 3D point cloud data. Though it reduces the dimensionality of the data, it operates directly on the point cloud and does not degrade the information contained in the data.

Figure 4:
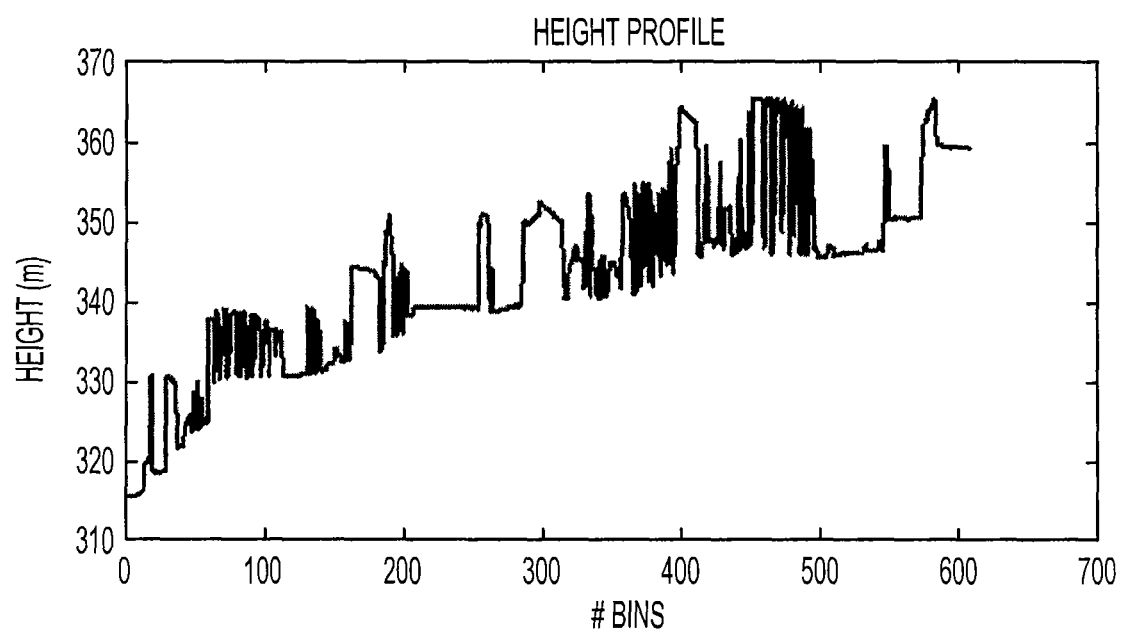
FIG. 4 is an example of a 1-dimensional (1D) height profile, in accordance with an embodiment of the present invention.

The present invention realizes that the continuous and smooth nature of the terrain on a large scale may be seen as a low frequency content buried inside the 1D height profile collection. Similarly, all the high frequency content may be associated to man-made objects and vegetation. Thus, man-made objects and vegetation may be visualized as noise. FIG. 4 shows a 1D height profile, as an example, with large variations in range associated with vegetation and man-made objects (i.e. building).

The 1D height profiles shows drastic changes in altitude which may be associated with changes in frequency. Change in frequency corresponds to discontinuities in the height profile. Under this assumption, wavelet transform (WT) provide several advantages over other types of filters. The wavelet transform (WT) is composed of a series of highpass and lowpass filters that are well localized in time and frequency. One of the advantages of using wavelets is that it allows multi-resolution analysis. This is an important property, since most of the terrain or man-made objects may be more distinguishable at a certain scale or resolution depending on the scene, for example, mountains and high buildings pertain to higher scales, while low vegetation and cars pertain to lower resolution spaces.

Filtering by the present invention decomposes the height profile into two sets of coefficients:

lowPassFilter $\Rightarrow$ aC, and highPassFilter $\Rightarrow$ dC, where aC are approximation coefficients that are the result of the wavelet's low-pass filter and dC are the detail coefficients that are the result of the wavelet's high-pass filter. The present invention identifies the low frequency content, which is associated with the terrain, and sets dC to zero, as follows:

dC=0

Next, the inverse wavelet transform is applied to reconstruct the terrain features.

It will be appreciated that the reconstructed signal does not contain only the terrain features of the original height profile, since the LADAR height measurements contain three components:

$H_{sensor} = H_{ground} + H_{non\text{-}ground} + H_{noise}$ where $H_{ground}$ is the ground elevation measurements, $H_{non\text{-}ground}$ is the object height measurements, and $H_{noise}$ is the height contribution for system noise and other external sources of noise.

This noise affects the elevation measurements. Therefore, some ground points may be misclassified as objects because of their high frequency noise content. Moreover, some scenes may contain terrain features with sharp discontinuities as ridges, cliffs, and high relieve hills or mountains. Such naturally occurring features possess enough high frequency content that it is difficult to distinguish them from non-terrain objects.

Another challenge is that buildings with large rooftops may be misclassified as ground points. It is a fact that buildings are piecewise continuous; thus, if the rooftop is large, then its center area may be sufficiently far away from the building's edge discontinuities. This may be confused as a low frequency. The only high frequency component at the center of the building may be limited to the contribution form the system's noise. One way to mitigate this is by using a higher level wavelet transform.

Figure 5:
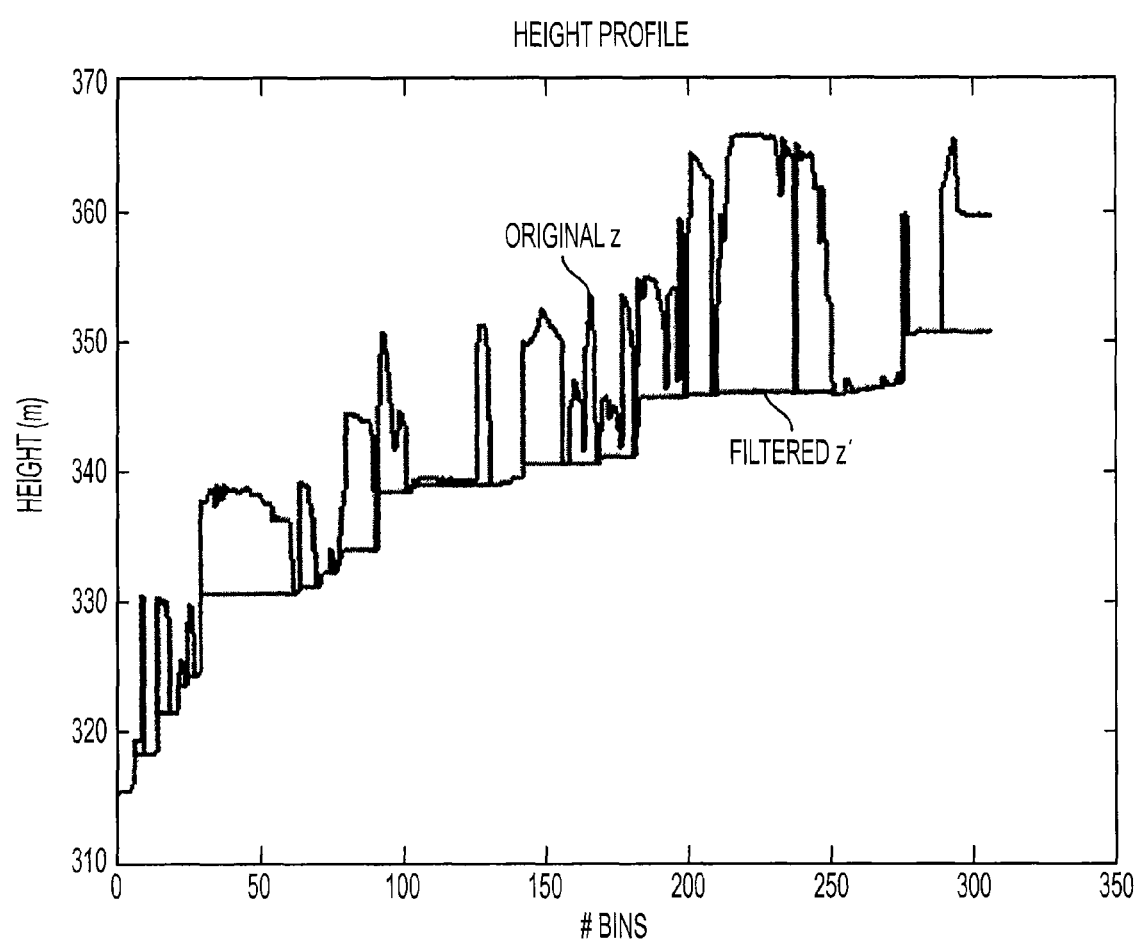
FIG. 5 is a filtered profile of the 1D height profile shown in FIG. 4.

The reconstructed height profile, however, preserves the low frequency content, which represents terrain features. It does not eliminate the non-ground points, but decimates the height profile of the non-ground features. Therefore, the present invention uses the reconstructed height profile as a threshold profile for the original height series data. Since there is a one-to-one point correspondence between the reconstructed and original profiles, all points in the original data that are below or at the same height as their corresponding reconstructed height profile point are classified as ground, while all points above the reconstructed height profile are classified as non-ground objects. Thus, the original profile shown in FIG. 4 is filtered, as shown in FIG. 5. The data is now classified as follows:

$z' = W^{-1}(aC, dC=0)$ if $z \le z' \Rightarrow z \in$ Ground Class if $z > z' \Rightarrow z \in$ Non-ground Class where: $W^{-1}$ is the inverse transform, Z' is the reconstructed height profile used as a threshold profile, Z is the actual height profile.

Dc is set to zero (0).

The above classification decision is used by decision box 15 shown in FIG. 1, where $z_f = Z'$. The Z' profile is determined by the inverse wavelet transform (IWT), or $W^{-1}()$. The wavelet transform (WT) will now be described.

The WT provides a time-frequency representation of a signal and a multi-resolution technique in which different frequencies may be analyzed with different frequency. To understand the WT is important to understand the continuous wavelet transform (CWT) and the discrete wavelet transform (DWT).

The CWT is given by the following equation:

$$X_{WT(\tau,s)} = \frac{1}{\sqrt{|s|}} \int x(t) \cdot \psi * \left(\frac{t-\tau}{s}\right) dt,$$

where x(t) is the signal to be analyzed, $\psi(t)$ is the wavelet (mother wavelet) or the basis function, $\tau$ is the translation parameter which relates the wavelet location function as it is shifted through the signal, s corresponds to the time information which is represented by 1/(frequency), and t is the time shift of the signal x.

the WT is derived from the mother wavelet shown above and is similar to shifting (dilation) and scaling (compression) the signal. Large scales of the signal are represent by low frequencies providing hidden information in the signal (dilation). Small scales are represented by high frequencies providing global information about the signal (compression).

The discrete wavelet transform (DWT) is based on an algorithm which yields a fast computation of the WT. It is easy to implement, reduces the computation time required, and give a time-scale representation of the digital signal obtained by digital filtering techniques. In the DWT process, the signal is passed through filters with different cutoff frequencies at different scales.

Figure 6A:
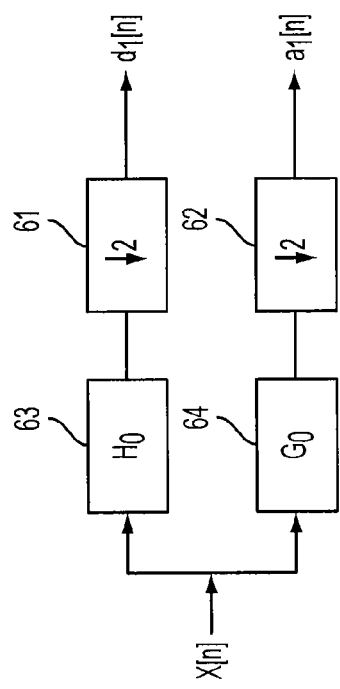
FIG. 6A is a block diagram representation of a 1-level discrete wavelet transform (DWT).

The DWT may be implemented by an interaction of filters with rescaling of the signal. Two important parameters of the signal are resolution and scale. The resolution is given by the details of the signal and the scale is determined by the up-sampling and down-sampling operations. FIG. 6A shows a block diagram of the DWT representation. The DWT may be computed using low-pass and high-pass filtering of the discrete time-domain signal. In FIG. 6A, which represent a DWT decomposition, $H_0$ 63 is a high pass filter and $G_0$ 64 is a low pass filter. The elements 61 and 62 are each down-samplers by a factor of two (2). The X(n) is the inputted discrete signal. The filter ($H_0$ and $G_0$) produce signals with half of the frequency band, doubling the frequency resolution as the uncertainty in frequency is reduced by half (down-sampling). According to the Nyquist theorem, if the original signal has the highest frequency of f, it requires a sampling frequency of 2f. Accordingly, the signal may be sampled at a frequency of f resolution, which is represented by half of the total number of samples. Thus, while the half band low-pass filtering removes half of the frequencies and thus halves the resolution, the decimation by two doubles the scale.

Figure 6B:
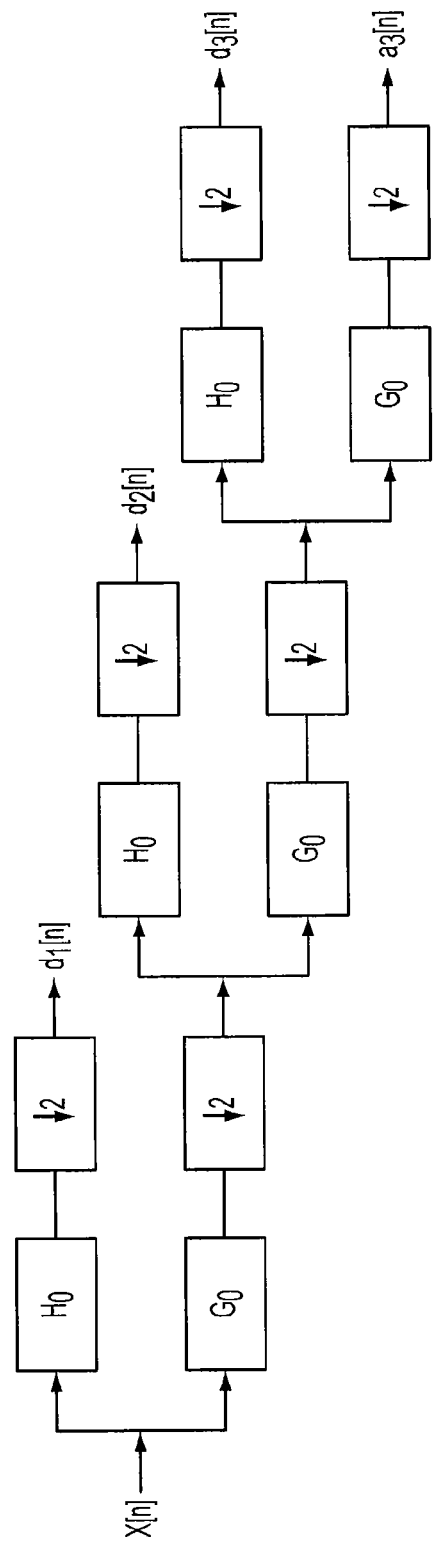
FIG. 6B is a block diagram representation of a 3-level DWT.

The time resolution becomes good at high frequencies, while the frequency resolution becomes good at low frequencies. This process of filtering and decimation may be continued until a desired level of decomposition is reached. FIG. 6B shows a decomposition level of three for a signal, x[n].

Figure 6C:
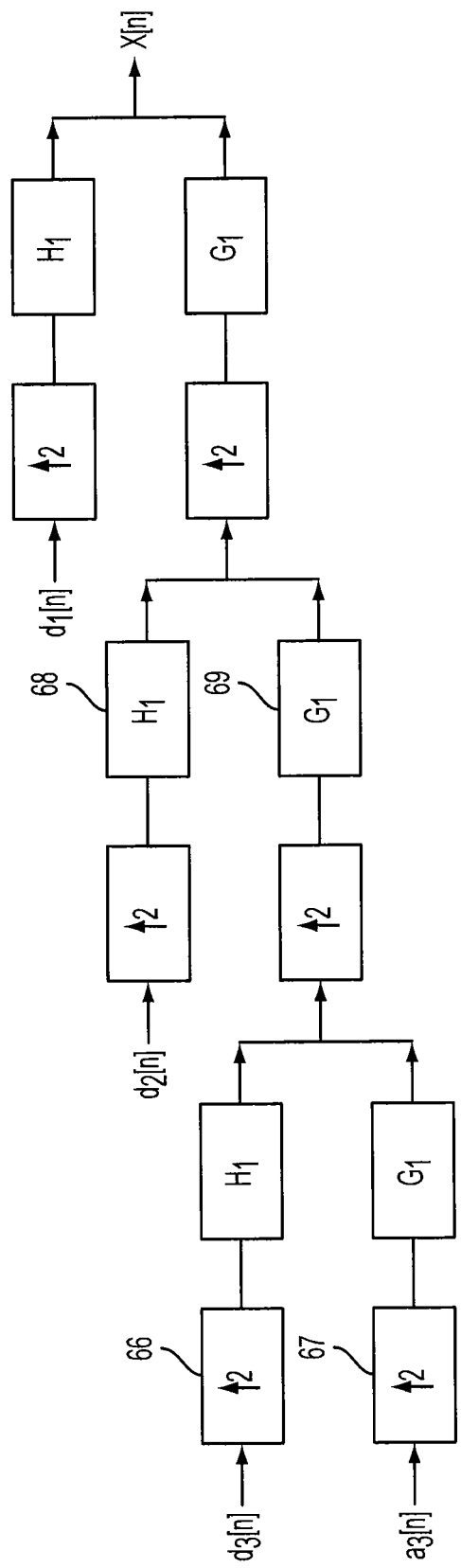
FIG. 6C is a block diagram representation of an inverse WT for reconstructing a signal which was decomposed by the 3-level DWT of FIG. 6B.

An inverse wavelet transform (IWT), also known as wavelet reconstruction, is determined by obtaining all the coefficients, a[n] and d[n], starting from the last level of decomposition. The process is the inverse of the WT. The approximation and detail coefficients at every level are up-sampled by two, passed through low-pass and high-pass filters and then added. This process is continued through the same number of levels as in the decomposition process to obtain the original signal. FIG. 6C shows the IWT block diagram at a three level decomposition.

As shown, elements 66 and 67 are each up-samplers by a factor of two (2); and $H_1$ 68 and $G_1$ 69 are high-pass and low-pass synthesis filters, respectively. The X(n) is the reconstructed discrete signal. To obtain a good reconstruction, the filters need to satisfy certain conditions. These conditions are given by the following statement:

Let $G_0(z)$ and $G_1(z)$ be the low-pass analysis and synthesis, and $H_0(z)$ and $H_1(z)$ the high-pass analysis and synthesis, respectively. The filters have to satisfy the following two conditions:

$$G_0(-z)G_1(z)+H_0(-z)H_1(z)=0, \quad (1)$$

$$G_0(z)G_1(z)+H_0(z)H_1(z)=2z^{-d}, \quad (2)$$

The first condition implies that the reconstruction is aliasing-free and the second condition implies that the amplitude distortion has an amplitude of one. This implies that a perfect reconstruction does not change if the analysis and synthesis filters are not switched. A number of filters which satisfy these condition exist, but not all of them provide a perfect reconstruction, especially when the filter coefficients are quantized.

Up to this point, the WT and IWT processes used by the present invention have been described. It will be appreciated, however, that the present invention may also use morphological operators. These operators will now be described.

Mathematical morphology includes operations that extract features from an image. The fundamental morphological operators are dilation and erosion. These operators are used typically in binary images to reduce and enlarge features. The erosion and dilation operators have been extended to grey scale images. The morphological operators have been extended to a range image by the present invention, in which the gray level represents distance from the sensor to the objects in the scene, rather than the intensity of light reflected from the scene. The morphological operators are, thus, applied to data measured by a LADAR system.

For LADAR measurement p(x,y,z), the dilation of elevation z at (x,y) is given by $$d_p = \max_{(x_p, y_p) \in \omega}(z_p),$$

where the points ($x_p$, $y_p$, $z_p$) represent p's neighbors (coordinates) within a window, w. This window may be 1D (line) or 2D (rectangle or other shape). The result of the dilation is the maximum elevation value in the neighborhood.

The erosion operator is given by $$e_p = \min_{(x_p, y_p) \in \omega}(z_p)$$

where the result is the minimum elevation value of the neighborhood.

It will be understood that the morphological operators may be omitted by the present invention, as shown, for example, in the embodiment of FIG. 1. The processing operations shown in FIG. 1 only include the WT and IWT processes. The morphological operators are not included.

Figure 7:
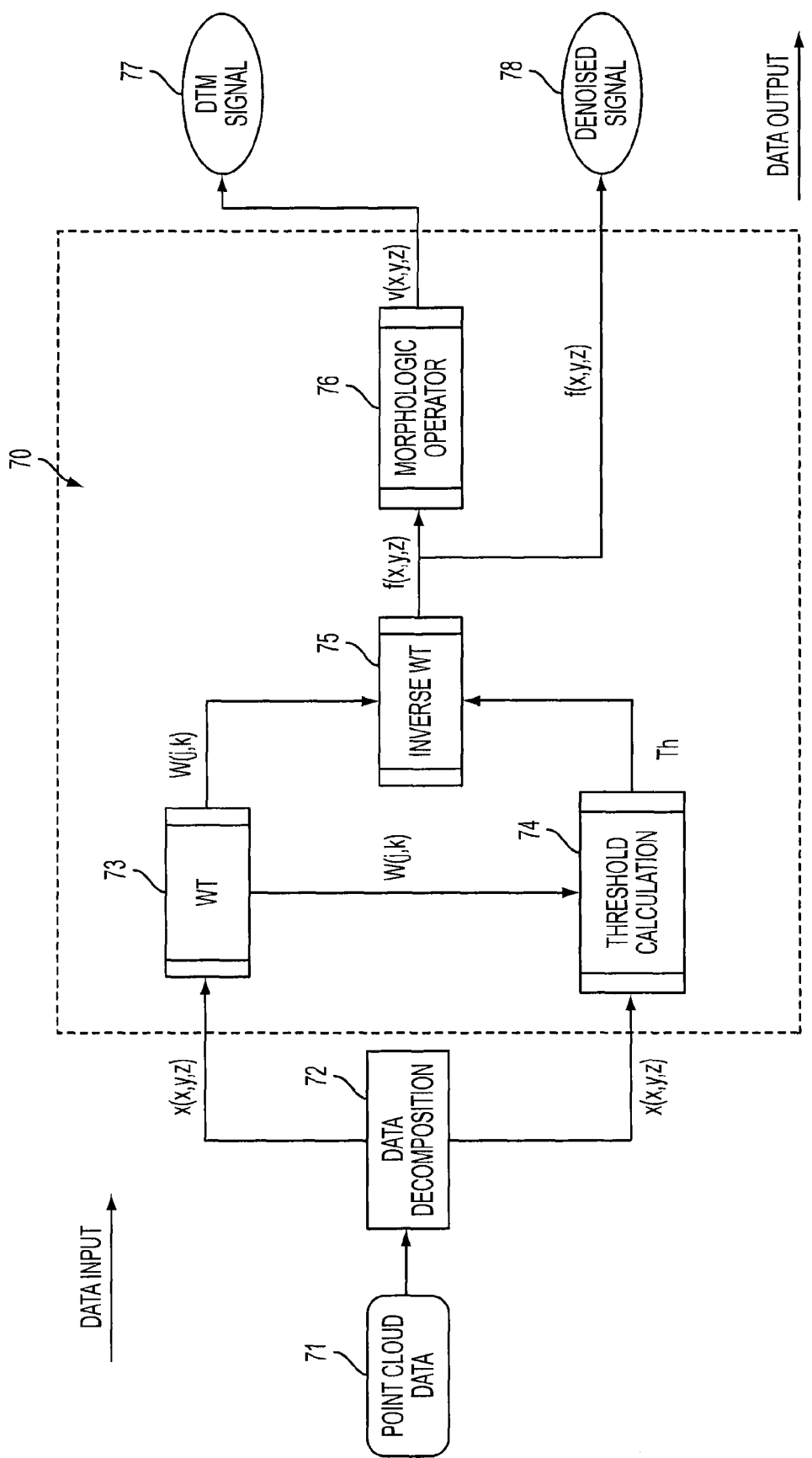
FIG. 7 is a block diagram of a system for visualizing point cloud data, in accordance with an embodiment of the present invention.

Referring now to FIG. 7, there is shown an embodiment of the invention that includes the WT and IWT processes and the aforementioned morphological operators. As shown, system 70 is comprised of a filter bank which includes WT module 73, IWT module 75 and morphological operator module 76. Also included, but may be a separate module, is threshold calculator 74. The data inputted into the filter bank is derived from a LADAR system (not shown), which provides point cloud data 71. The data 71 is pre-processed by a data decomposition module, generally designated as 72. The data outputted from filter bank 70 includes de-noised signal 78 and a digital terrain model (DTM) signal 77. The de-noised signal 78 is the direct output from the IWT module 75, and may be used for many different purposes. Examples of other systems (not shown) that may use de-noised signal 78 are signal filters, feature extraction modules, signal compression modules, and others.

The DTM signal 77, which is outputted from IWT module 75, is further filtered by morphological operator module 76. Thus, filter bank 70 combines the WT and morphological operators. The morphological operators are used to remove non-ground objects based on predetermined terrain slope and object height. The filter bank takes the point cloud data in the XYZ format and decomposes it into one signal for each rectangular coordinate (x,y,z). Then, the WT is computed for each signal and a threshold for filtering purposes is determined before applying the inverse wavelet transform (IWT).

The filtered signal, f(x,y) is processed by morphological operations of erosion and dilation, which removes the pixels of vegetation and buildings. The morphological filter uses a circular mask for neighborhood detection and interpolation of pixels. The process of interpolation is used to reconstruct areas where the information is missed. For example, it may be used for reconstructing buildings, vegetation, and terrain surfaces.

Then, the signal is processed again with another morphology filter which uses a square mask to eliminate the pixels that correspond to vegetation.

Figure 8A:
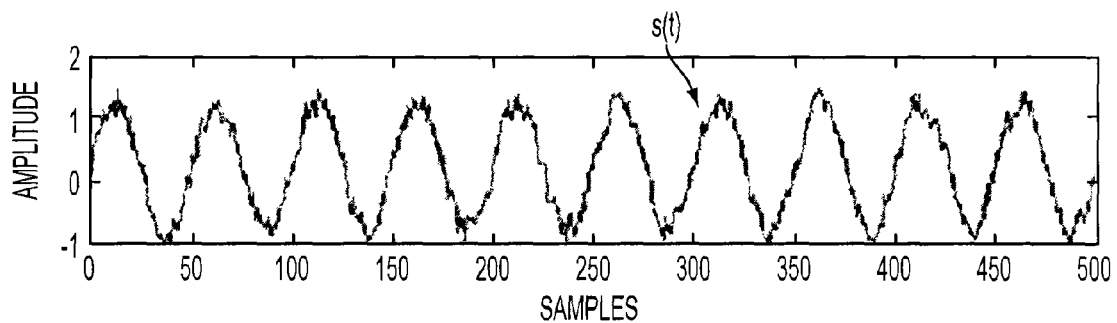
FIG. 8A is an example of a sinusoidal signal inputted into a DWT.
Figure 8B:
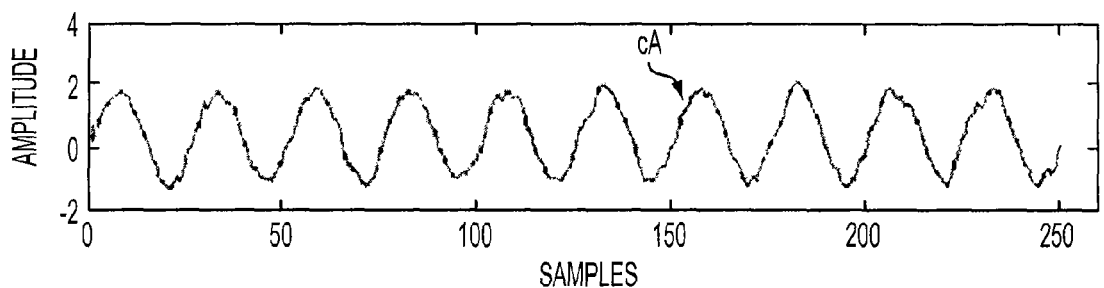
FIG. 8B shows the approximation coefficients (cA) of the sinusoidal signal of FIG. 8A.
Figure 8C:
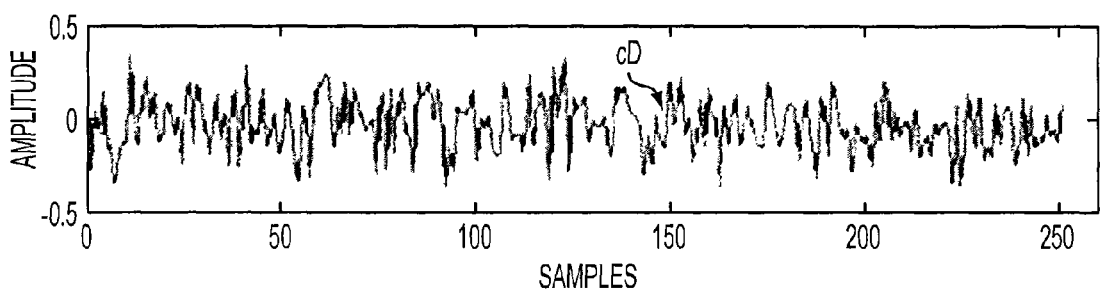
FIG. 8C shows the detail coefficients (cD) of the sinusoidal signal of FIG. 8A.

As an example of the effectiveness of the present invention, and for purpose of explanation, the following sinusoidal signal is assumed to be inputted into the WT module:

$$s(t)=\sin(20t)+N(t).$$

where N(t) is noise and is represented by a random signal. The signal s(t) is generated with 500 samples points of data, and is presented in FIG. 8A. The approximation (a[n]) and detail (d[n]) signals are shown in FIGS. 8B and 8C, respectively. The approximation (a[n]) and detail (d[n]) signals have 250 sample points of data.

Figure 9A:
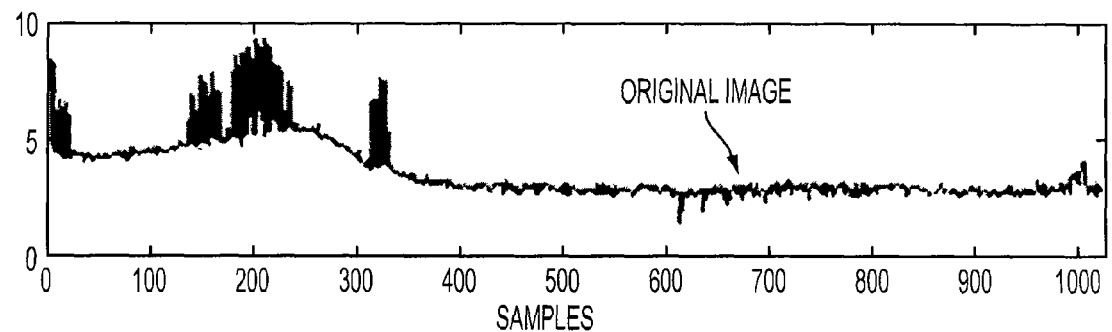
FIG. 9A is an example of a signal showing an original image.
Figure 9B:
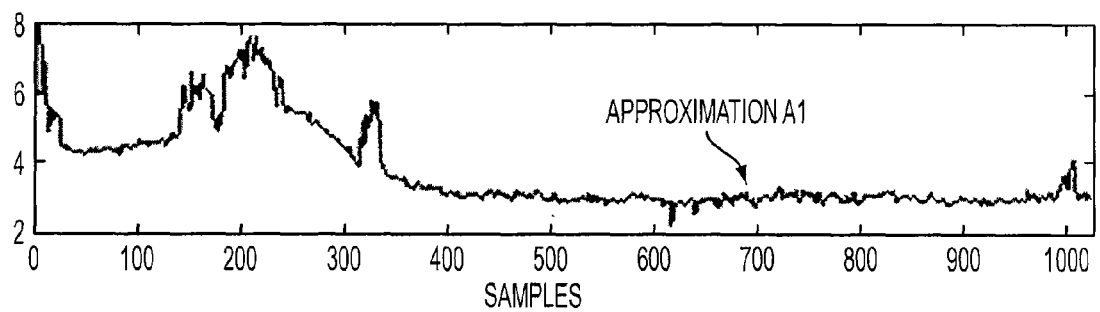
FIG. 9B is a WT approximation signal (A1) of the original signal shown in FIG. 9A.
Figure 9C:
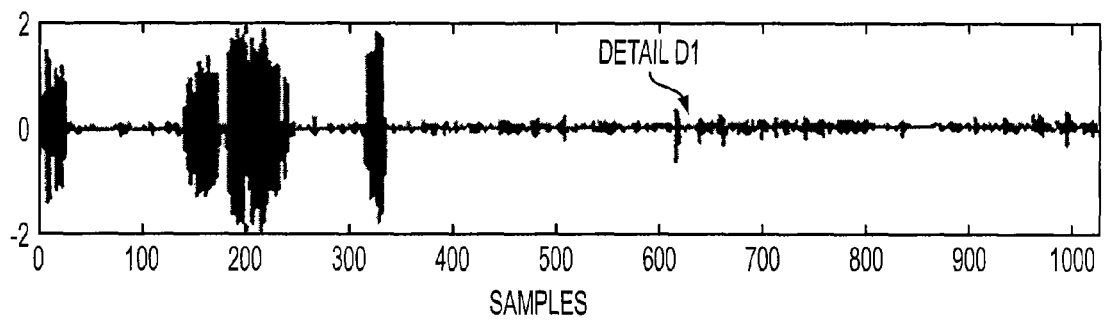
FIG. 9C is a WT detail signal (D1) of the original signal shown in FIG. 9A.

Continuing the example for purposes of explanation, the LADAR data provided to filter bank 70 of FIG. 7 is in the XYZ format. The XYZ data is decomposed into three signals, one signal per axis (X,Y,Z). Each signal is processed using a 1D algorithm (as described earlier with respect to FIG. 3) and converted again into the XYZ format. FIG. 9 shows an example of the filtering process using the WT of a 1D signal. This signal is the Z signal which is decomposed and filtered using the WT. FIG. 9A is the original Z signal with noise, FIG. 9B is the approximation signal of the first level decomposition, and FIG. 9C is the detail signal of the first level decomposition. The detail signal may be considered as the noise of the original signal removed by the high-pass filter, while the approximation signal may be considered as the filtered signal filtered by the low-pass filter. Comparing FIG. 9A and FIG. 9B, it may be concluded that 9B is a de-noised version of 9A.

Figure 10A:
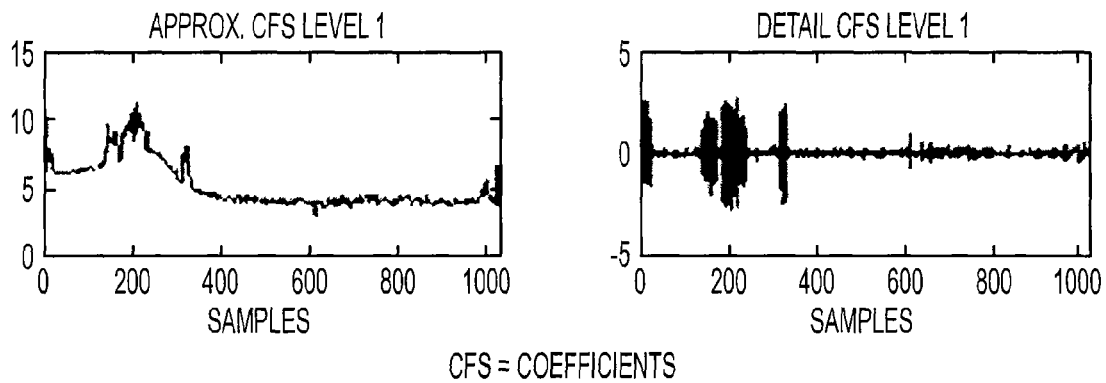
FIG. 10A shows the approximation and detail coefficients of a 1-level WT of the signal shown in FIG. 9A.
Figure 10B:
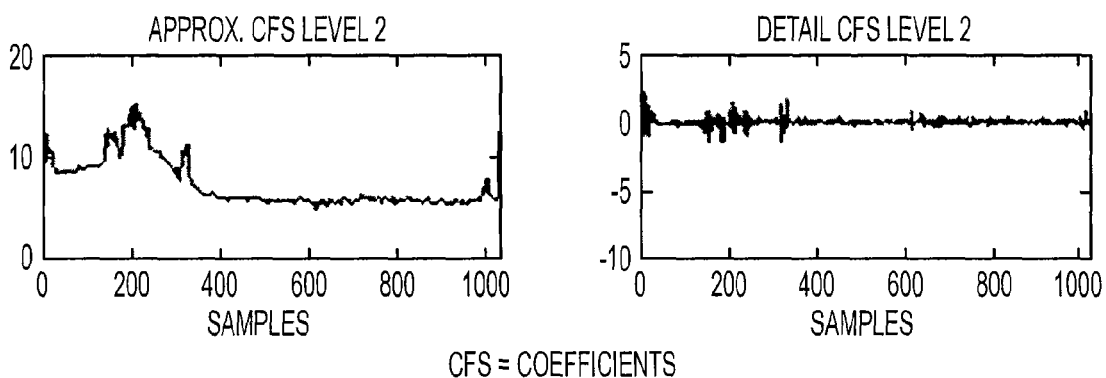
FIG. 10B shows the approximation and detail coefficients of a 2-level WT of the signal shown in FIG. 9A.
Figure 10C:
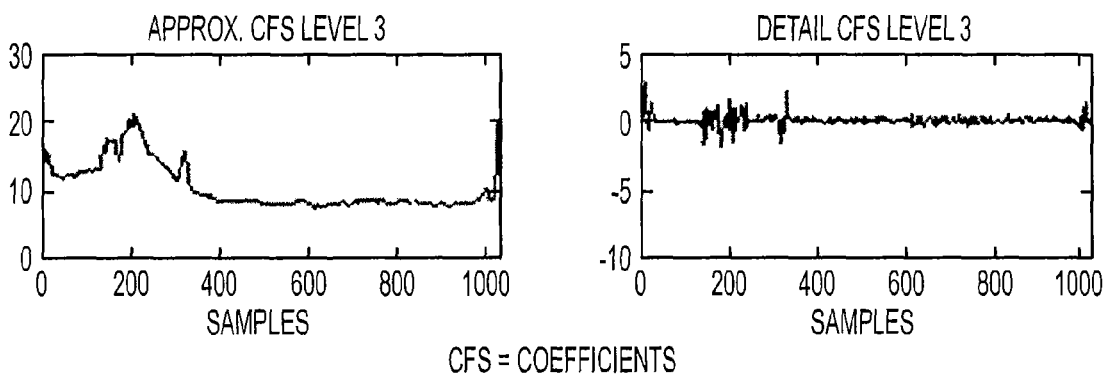
FIG. 10C shows the approximation and detail coefficients of a 3-level WT of the signal shown in FIG. 9A.

Taking the first three levels of decomposition, the following coefficients are obtained, coefficients are obtained, coefficients of approximation (cA) and coefficients of details (cD). FIG. 10 shows the results of each level. Decomposing a signal to a high level of decompositions may be a problem, because the filtered signal may lose information of the original signal. A method of determining the maximum level of wavelet decomposition of a signal includes the following criterion. The signal length is determined by $N=2L$ where N is the total number of samples. One signal can be expanded in x different ways, where x is the number of binary sub-trees (FIG. 6B) of a complete binary tree level of depth L, resulting in $x \geq 2^{N/2}$.

Figure 11A:
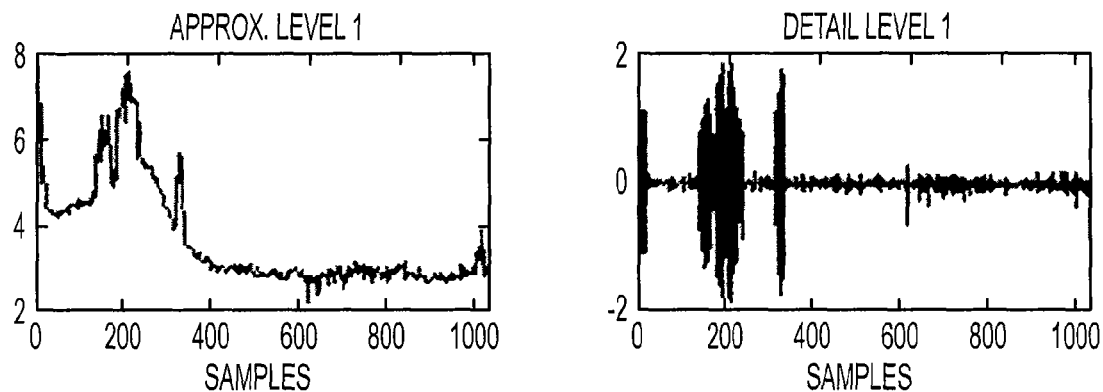
FIG. 11A is a reconstruction of the 1-level WT signal shown in FIG. 10A.
Figure 11B:
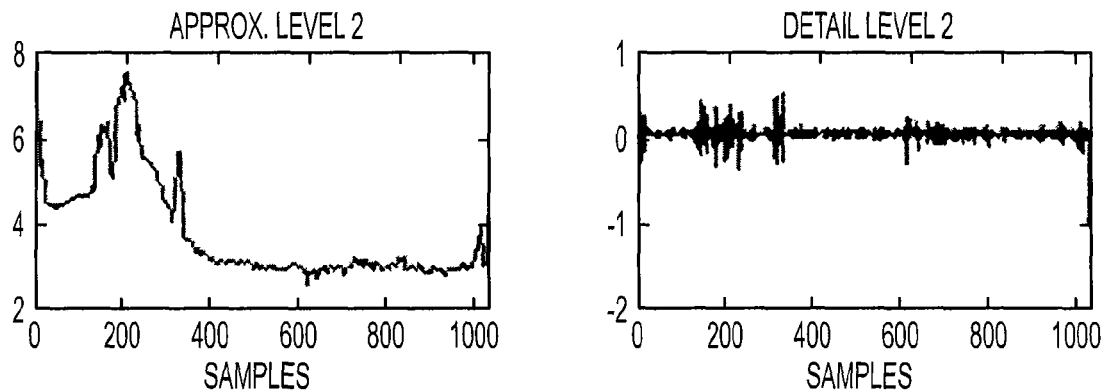
FIG. 11B is a reconstruction of the 2-level WT signal shown in FIG. 10B.
Figure 11C:
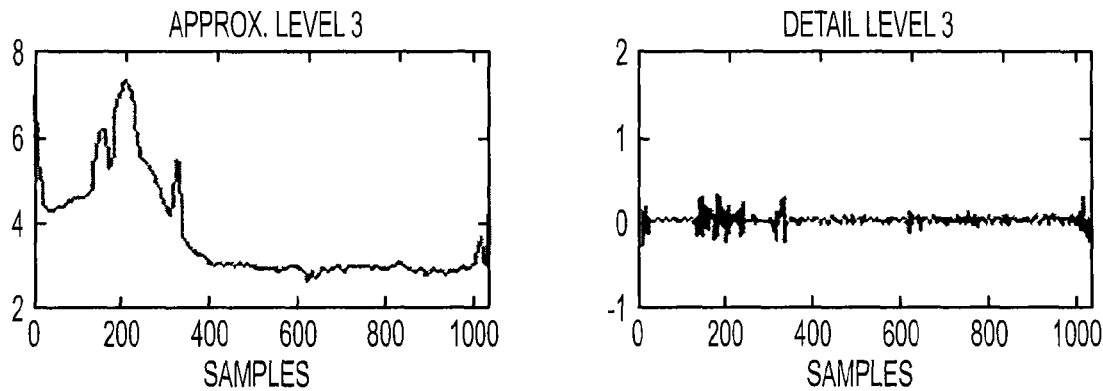
FIG. 11C is a reconstruction of the 3-level WT signal shown in FIG. 10C.

Using the decomposition coefficients, the approximation and details signals are then reconstructed. The approximation and detail signals are important because they are used for signal de-noising. The reconstructed signals are shown in FIG. 11 for each level of decomposition. Looking at the approximations signals, one may see how the noise is eliminated at a higher level of decomposition. To remove the noise, a threshold is determined by the threshold calculator 74. The threshold may be determined from the detail coefficients. That threshold is also known as a global threshold. The threshold is needed to de-noise the signal based on the noise determined by the detail coefficients, and depends on the decomposition level used.

The above examples used LADAR point cloud data, which is decomposed into a 1D format, as previously explained. A similar procedure may be used in which the point cloud data is decomposed into 2D format using a TIFF format. The procedure in processing the data is the same, only it is oriented for signals of higher dimension. The procedure uses the 2D DWT and is capable of analyzing images using single-level and multi-level decomposition and reconstructions. The procedure takes an image, X, and computes its single level of decomposition. As an example, the procedure generates the coefficient matrices up to level 3, called approximations (cA), horizontal, vertical, and diagonal details (cH, cV, and cD). These coefficients are used to reconstruct the approximation (A), horizontal (H), vertical (V), and diagonal (D) signal at each level of decomposition. The de-noising procedure is the same as the 1D algorithm, and the threshold values are determined in the same way.

It will be understood that while the discrete wavelet transform (DWT) has previously been described, nevertheless, the present invention may use all of the following wavelet transforms;

(a) Continuous Wavelet Transform (CWT): calculates the decomposition coefficients of the one dimensional wavelet transform of the discrete function S. It uses a piecewise constant interpolation to transform S into a continuous function.

(b) Discrete Wavelet Transform (DWT): calculates the wavelet coefficients for a single-level decomposition of a discrete function S. The output of this transformation has the same dimensions as the input signal.

(c) Stationary Wavelet Transform (SWT) performs a multilevel 1D stationary wavelet decomposition; this type of transform does not decimate the data and is shift invariant.

(d) Multilevel Wavelet Decomposition (wavedec): a version of the DWT that performs a multilevel one-dimensional wavelet analysis.

The performance of the four wavelets was measured. After performing a test with the data ordering using column profiles in the x direction (i.e. the binning occurs in the x direction so the length of the columns are along the y direction), the test was repeated using column profiles in the y direction. For this test, only a level one of decomposition was used. The total errors when using columns across the y direction were consistently lower than the total errors of the columns across the x direction. The object errors and ground errors behaved similarly, with the object error always higher than the ground error for both cases of ordering.

It is worth noting that the results were similar for the SWT, DWT, and wavedec. The main difference between them comes from the processing time it takes to perform the wavelet decompositions. For a single wavelet decomposition, DWT and wavedec had close performance numbers, and the SWT usually lagged in time to complete the decomposition and reconstruction. Since SWT is actually an average of two sets of DWT coefficients, which are obtained by discarding the odd or even coefficients in the decimation step, it is expected to take longer to do the transform.

The above tests were repeated by using a wavelet level equal to five (5). For these tests there is not a clear tendency as to which column profile direction gave the better result. Total error results for CWT and DWT remained similar to the ones using level one wavelets. However, the total error for SWT and wavedec were clearly lower for the urban sites, while they were slightly lower for most of the rural sites. The total error reductions of the urban sites came from object and ground error reductions, for the level five (5) wavelets. For the rural sites, the object error remained high, while the ground error had marginal reductions. The SWT consistently had total error results lower than the wavedec error; this is at the cost of taking as much as ten (10) additional seconds to process the data.

Another test included organizing the data along different direction. For example, the data was first ordered along the y-direction and then the data was ordered along the x-direction. This is equivalent to rotating an image by 90 degrees. Lower errors were obtained by using level five (5) wavelets than by using the first single level decomposition and reconstruction. Again the ground errors were lower for the rural sites.

Based on the performance tests, the best wavelet type for bare earth extraction is the SWT, probably because of its shift invariance property. Also, it appears that dividing the data by column profile lines and processing them individually, instead of a single profile column, yields better classification results. Another tendency that is clear, is that the use of level five wavelets results in lower total errors of the classification. Since none of the wavelets used were rotation-invariant, the orientation of the features in the scene affect the performance of the filters. In addition to the ordering scheme (which is the most computationally intensive part of the process), the SWT is also more computationally expensive than the DWT and wavedec, since it does not decimate the coefficients during the wavelet analysis. This adds additional memory requirements. Taking all of this into consideration, the following is concluded:

(a) If better results are required, then the ordering scheme should process individual column profiles along one of the dimensions individually, and the type of transform used should be the SWT.

(b) If there are computational time and memory constraints (e.g. low processors machines, or large data sets, etc.), then the individual column profiles should be merged into one profile, and the wavelet type should be the wavedec transform.

(c) Wavelet levels higher than level one should be used for better results.

(d) The orientation of the features in the scene affect the performance of the wavelets analysis, because of lack of rotational invariance.

(e) The most computation intensive process is the sorting algorithm. The decimation step that takes place using the wavedec transform makes it an efficient process, both in time and computational complexity.

For the urban sites, the tendency is for level five analysis to yield the lower errors. For most of the rural sites, using a level four wavelet transform provides the lower errors. The error difference from level four to level five is not significant.

Recall FIG. 1, in which the most relevant information is in the altitude. The present invention takes advantage of this fact and, in the embodiment shown in FIG. 1, applies the wavelet transform to the z-coordinate values. The altitude vales are ordered in some correlated manner as to retain information of its neighborhood. One way, as described previously, is by ordering the z-values in the same order as the data was collected, that is along the swap direction of the laser sensor. By doing so most of the data becomes connected. That is, the points $z_{i-1}$, $z_i$ and $z_{i+1}$ are immediate neighbors in the original geo-reference data. By omitting that the laser sensor swaps back, when it reaches a certain point, errors are introduced. An error is that points that are at the end of a swap line are ordered just before z-values that are at the beginning of a new swap line. Those z-values may correspond to points that are not correlated and are separated geographically by a big distance. The ordered z-values are decomposed using discrete wavelet transform. For the bare earth, the detail coefficients may be seen as noise. Thus, by removing that noise a smoother and a closer surface to the real bare earth is obtained. The z-values are reconstructed by using the approximation coefficients and setting all the detail coefficients to zero. The reconstructed z-values that correspond to objects are less than the original z-values. The z-values that correspond to ground points are smoother, but maintain approximately the same value as the original. Thus, the reconstructed z values are used as a threshold; all points that are higher than their corresponding reconstructed z-value are classified as non-ground points. The remaining points are classified as altitude values associated with the bare earth. The final output are the z-values with their corresponding x-y coordinates, all labeled as objects or bare earth.

The embodiment shown in FIG. 1 exploits the low frequency content of a scene, represented by the approximation coefficients of the wavelet transform, to separate the terrain points and the non-terrain points. Recall that the detail coefficients of the wavelet transform is set to zero (0). In another embodiment, the present invention exploits the high frequency content of a scene to locate edges of non-terrain features. It will be appreciated that edges in an image may be seen as local discontinuities which have high frequency content. Therefore, by setting the approximation coefficients of the wavelet transform to zero (0), the edges in the scene may be detected. Accordingly, the present invention uses a wavelet analysis similar to the one used for the BEE method to locate points that form edges in the point cloud. Thus, the present invention performs a single level decomposition of the height column profile using the wavedec transform. An assumption is made that the information needed to locate the edges may be obtained from the wavelet's detail coefficients. Because of that, the present invention discards all of the information form the approximation coefficients of the height series profile by setting its values to zero, as follows:

lowPassFilter⇒ aC=0

Next, the inverse wavelet transform is reconstructed. Because of their higher energy content, the non-terrain object edges are more dominant than the rest of the objects. This is reasonable since the edges are the points in which the discontinuities on the terrain surface occur. A constant threshold value is used by the present invention to separate the edge points from the non-edge points. As an example, 0.9 is a good threshold value. Accordingly, z'=(aC=0, dC)

if z>0.9'⇒ =z∈Edge Class
if z≤0.9⇒ Discard, no Class

This method identifies the edge points of the reconstructed signal. Since there is a point correspondence between the original height column profile and the reconstructed one, edge points in one corresponds to edge points in the other. The height values are then paired back with their x, and y coordinate values to obtain a point cloud of all the edges in the scene.

Figure 12B:
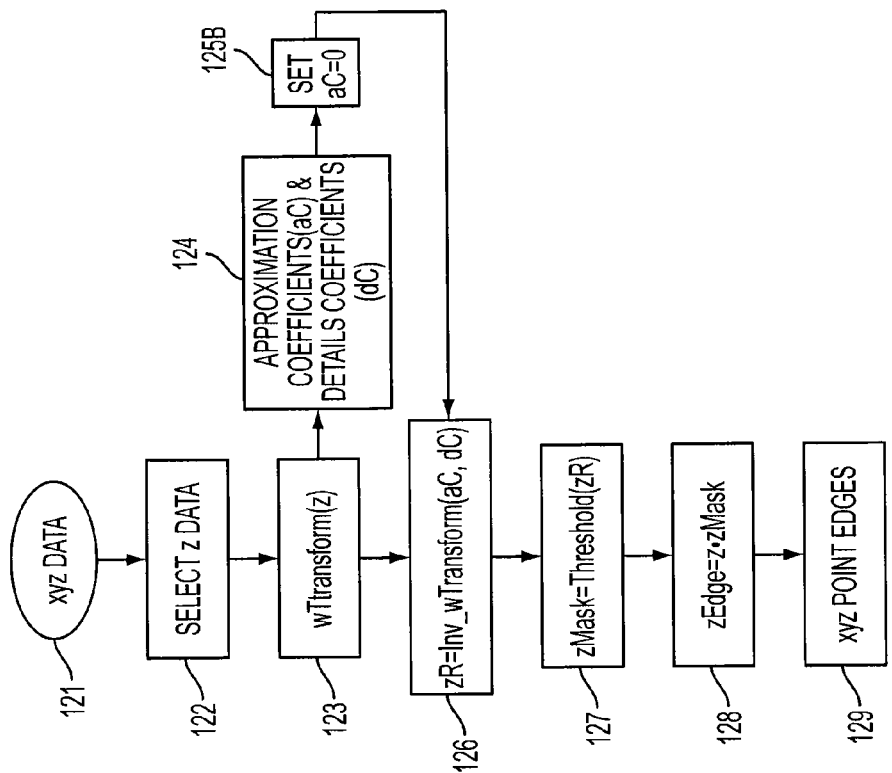
FIG. 12B is an exemplary edge detection method, in accordance with an embodiment of the present invention.
Figure 12A:
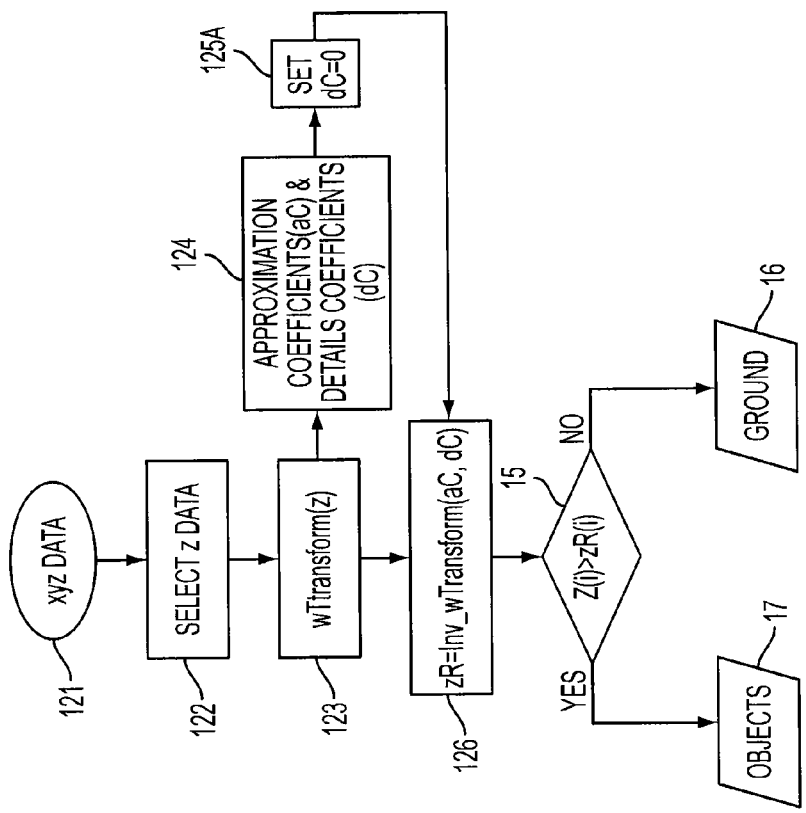
FIG. 12A is an exemplary bare earth extraction (BEE) method, in accordance with an embodiment of the present invention.

Referring now to FIGS. 12A and 12B, there is shown a comparison between an algorithm that detects objects/ground terrain (FIG. 12A) and an algorithm that detects edge points (FIG. 12B). As shown, each algorithm receives point cloud data and decomposes the data using a wavelet transform (steps 121, 122, 123 and 124). Whereas the detail coefficients are set to zero in step 125A of the algorithm shown in FIG. 12A, the approximation coefficients are set to zero in step 125B of the algorithm shown in FIG. 12B. Step 126 then reconstructs the signal using the inverse wavelet transform. Steps 15, 16 and 17 separate an object from a ground terrain. Steps 127, 128 and 129 determine the point edges in the image.

Figure 13:
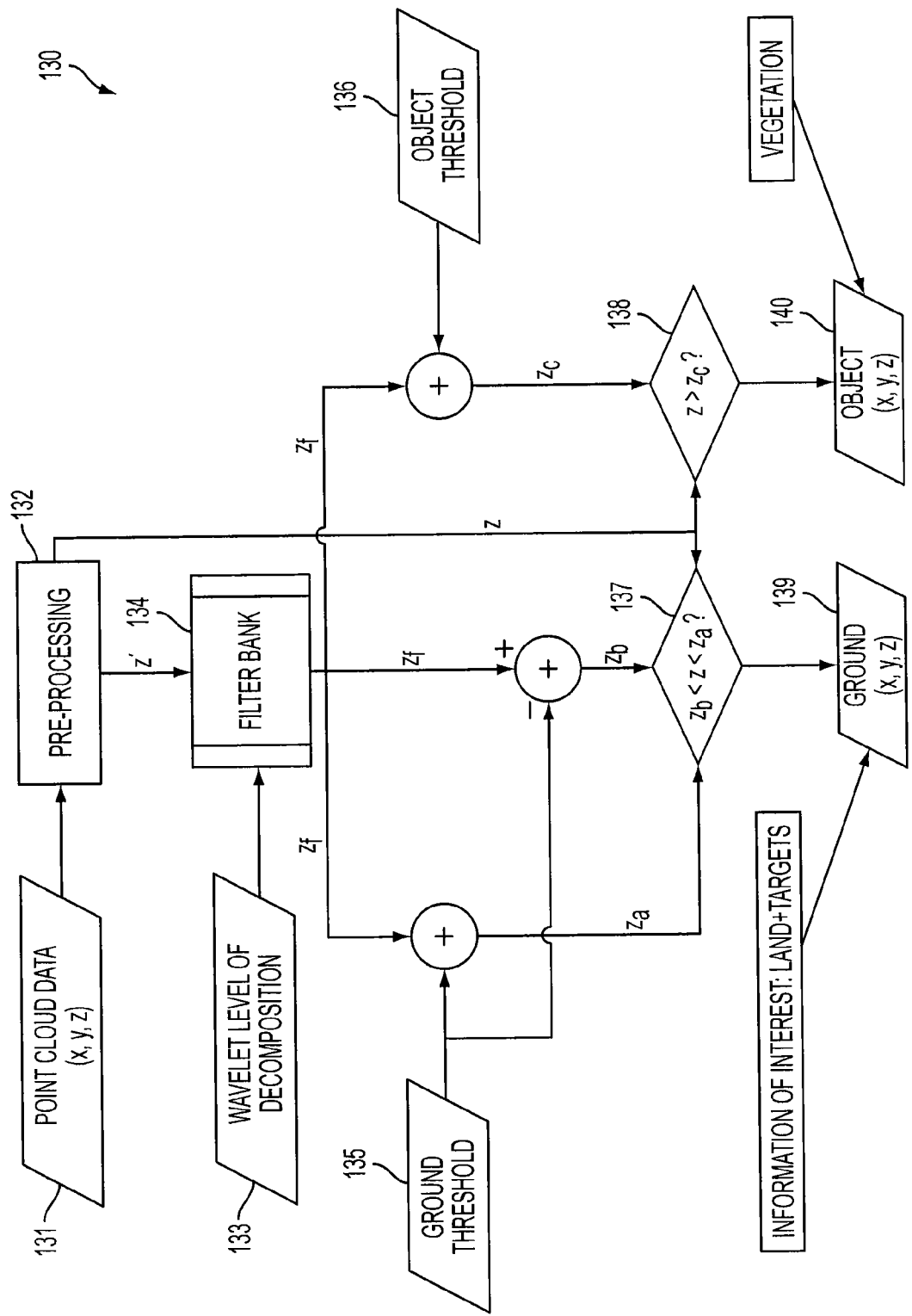
FIG. 13 is another embodiment of the present invention showing a method of processing point cloud data, in which z is the original data.

Referring next to FIG. 13, there is shown yet another embodiment of the present invention. As shown, system 130 receives point cloud data 131 and uses module 132 for pre-processing the data. Module 132 is similar to module 12 of FIG. 1, except that additional filtering is added to module 132 in order to attenuate the amplitude of some objects. Attenuating the high frequency components of the objects helps eliminate some object and improve the decision process for classifying the ground points and the object points as performed by decision blocks 137 and 138.

Method 130 received point cloud data in the x, y, z format and pre-processes the data. The pre-processing module 132 organizes the data and removes some high frequency components on the height profile. Then, the pre-processed signal is filtered by using wavelet decomposition module 133 and filter bank 134. The output of the filter bank is the reference ground signal, $z_f$. The wavelet decomposition module and the filter bank are similar to components 13 and 14, respectively, of FIG. 1.

The pre-processing module organizes the data in the same way as previously described with respect to FIG. 1. The difference is that filtering has been added after the data is organized. This filtering helps to eliminate some components of high frequencies that correspond to different objects, (see FIG. 14). The filter may be implemented by morphological operators, Fourier, Gaussian, alpha-filter, masking or windowing, as examples. The filtered signal is referred to as z'.

Figure 14:
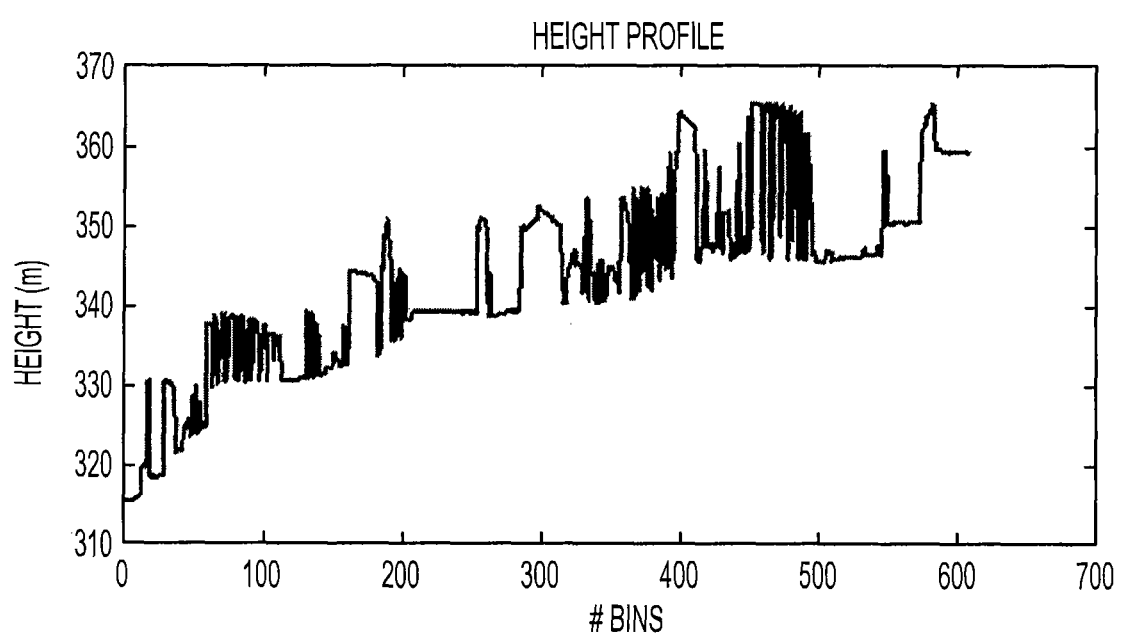
FIG. 14 is a height profile (z') resulting from the preprocessing step of the method shown in FIG. 13.
Figure 15:
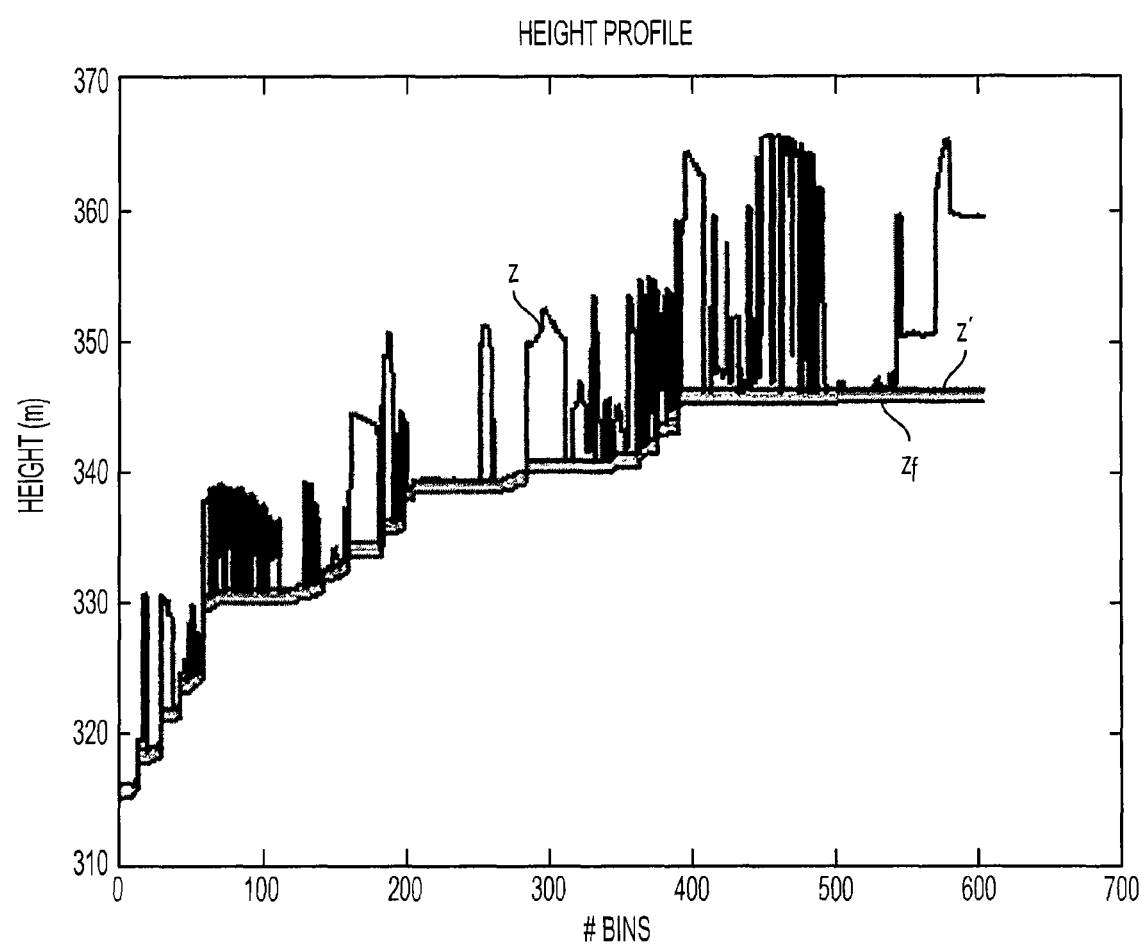
FIG. 15 are examples of a filtered ground signal and a filtered object signal resulting from the decision blocks shown in FIG. 13, in accordance with an embodiment of the present invention.

After the pre-processed signal z' is filtered by the filter bank 134 it is used as the ground reference signal ($Z_f$). The ground reference signal is combined with the threshold values of ground 135 and object 136, as shown in FIG. 13, to obtain the decision rules of each class. The ground and object decision rules are given by:

$$Za = Z_f + G_T$$

$$Zb = Z_f - G_T$$

$$Zc = Z_f + O_T$$

if $Zb < Z < Za \Rightarrow z \in$ Ground Class if $Z > Zc \Rightarrow z \in$ Object Class where Z is the original organized height signal, $G_T$ is the ground threshold, and $O_T$ is the object threshold. These threshold values help to minimize the overlapping between both classes. The overlapping is occasioned by noise in the data, filter ripples, etc. FIGS. 14 and 15 show examples of how the decision rules are applied in the classification process.

In summary, the present invention implements a BEE processor (or method) based on the wavelet transform to classify LADAR (or LIDAR) point cloud data in the x, y, z format. One example is removing buildings from mountain regions. Ground points may be used for generating digital elevation models (DEMs), flood & coastal analysis, among others. Object points may be used for reconstructing 3D buildings, target detection and canopy analysis. Vertical obstruction (VO) objects (objects that are 15 meters above the ground surface) may be determined by the combination of ground and object points. Thus, the present invention may be useful for different application and data exploitation.

In addition, the method 130 (or system) shown in FIG. 13 is an improvement over the method 10 (or system) shown in FIG. 1. The method 130 has the advantage to execute a good classification with lower levels of decomposition. At level 2, the average of ground error for the enhanced algorithm (EA) 130 is much less than the original method (OA) 10.

Figure 16:
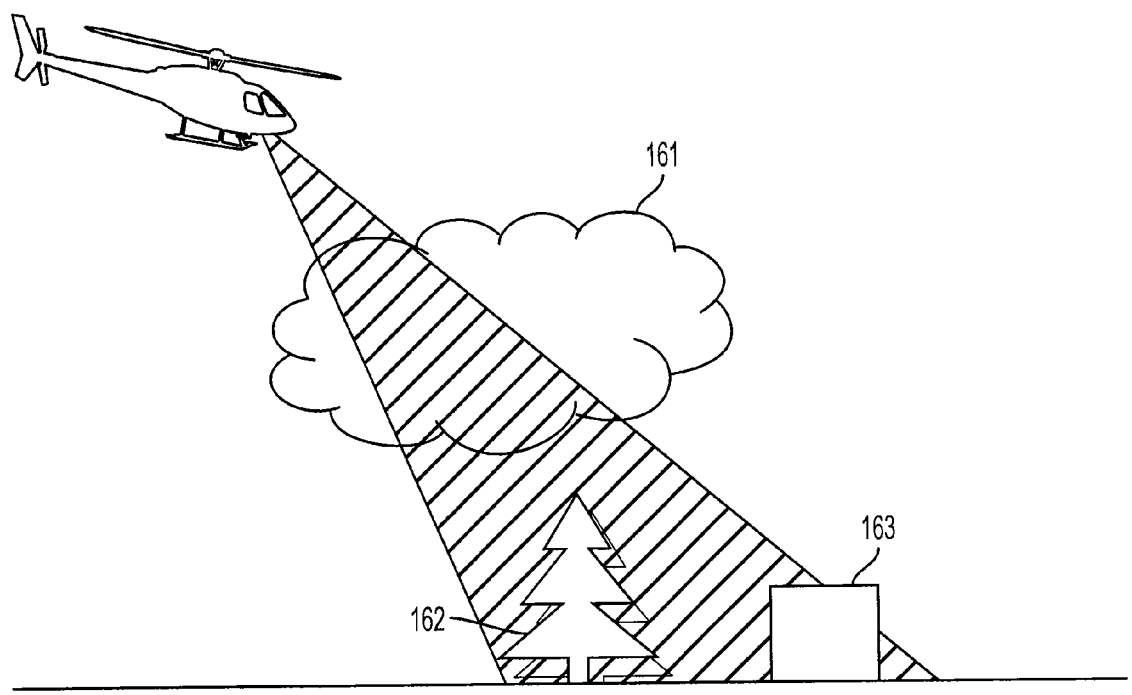
FIG. 16 is a helicopter containing the processing system of the present invention, while using a LADAR system to derive point cloud data of man-made objects, vegetation and terrain profiles.

In addition to the above, the present invention uses morphological operators of dilation and erosion to remove points of data that correspond to vegetation (see 162 in FIG. 16.). The present invention may be used to obtain a digital terrain model (DTM) of wild areas. In areas that have buildings (163) and other man-made structures, the present invention works well for images that have more vegetation than buildings. The present invention penetrates through foliage to detect a target, such as the terrain, or ground profile.

Finally, the present invention is capable of removing noise caused by obscurants (i.e. clouds, dust, brownout, whiteout, etc.). FIG. 16 shows the concept in which the cloud 161 causes a false detection. That false detection may be considered as noise in the generated point cloud because the cloud attenuates the transmitted light and generates some scattering of the light.

Moreover, the present invention may also be used to remove noise in point clouds that are generated by Geiger mode sensors, the latter being more sensitive to noise than LADAR or LIDAR systems.

What is claimed:

1. A method for detecting a terrain profile using point cloud data, the method comprising the steps of:
   receiving point cloud data in a three-dimensional (3D) space from an airborne platform;
   reformatting the point cloud data from the 3D space into a one-dimensional (1D) space to form a 1D signal;
   decomposing the 1D signal using a wavelet transform (WT) to form a decomposed WT signal;
   reconstructing the decomposed WT signal to form a low-pass filtered profile; and
   classifying the low-pass filtered profile as the terrain profile;
   wherein decomposing the 1D signal includes:
   calculating approximation coefficients (aC) for the 1D signal, and calculating detail coefficients (dC) for the 1D signal.

2. The method of claim 1 including the steps of:
   forming a height signal using the 1D signal; and
   classifying a height point of the height signal as a point of an object, if the height point is above a corresponding point of the low-pass filtered profile.

3. The method of claim 2 wherein
   the object includes a man-made object or vegetation disposed above the terrain profile.

4. The method of claim 1 wherein
   the terrain profile includes a natural terrain profile, or a ground profile.

5. The method of claim 1 wherein receiving the point cloud data includes:
   receiving x, y, z data from a laser detection and ranging (LADAR) system, wherein
   x and y data are imaging data in the x and y directions of an imaging array, respectively, and
   z data is intensity data in the z direction of the imaging array.

6. The method of claim 5 wherein reformatting the point cloud data includes:
   dividing the imaging data into a plurality of dx strips, in which each dx strip is a narrow delta in the x direction of the imaging array, and
   forming the 1D signal as z data in each of the plurality of dx strips.

7. The method of claim 6 wherein
   the z data is formed by moving in the y direction as a function of each consecutive dx strip in the x direction.

8. The method of claim 7 wherein
   the z data is formed by moving, sequentially, in an ascending order of the y direction and a descending order of the y direction as a function of each consecutive dx strip in the x direction.

9. The method of claim 1 wherein reconstructing the decomposed WT signal includes:
setting the detail coefficients (dC) to zero, and
calculating an inverse transform ($W^{-1}$) of the WT, after setting the detail coefficients (dC) to zero, to form the low-pass filtered profile.

10. The method of claim 9 wherein
the decomposing step includes calculating at least three levels of aC and dC, and
the reconstructing step includes setting the at least three levels of dC to zero, and
synthesizing the at least three levels of aC to form the low-pass filtered profile.

11. The method of claim 1 including the steps of:
using morphological operators to further filter the terrain profile, and
providing the further filtered terrain profile as data to a digital terrain map (DTM).

12. The method of claim 11 wherein
the morphological operators include dilation and erosion.

13. The method of claim 1 including the steps of:
reconstructing the decomposed WT signal to form a high-pass filtered profile; and
classifying the high-pass filtered profile as discontinuities in the terrain profile;
wherein the discontinuities denote edges of man-made structures.

14. The method of claim 13 wherein decomposing the 1D signal includes:
calculating approximation coefficients (aC) for the 1D signal, and
calculating detail coefficients (dC) for the 1D signal; and
reconstructing the decomposed WT signal includes:
setting the approximation coefficients (aC) to zero, and
calculating an inverse transform ($W^{-1}$) of the WT, after setting the approximation coefficients (aC) to zero, to form the high-pass filtered profile.

15. The method of claim 1 wherein
the WT includes a discrete WT, a continuous WT, a stationary WT and a multilevel wavelet decomposition (wavedec).

16. A method for detecting a terrain profile, through foliage, using point cloud data, the method comprising the steps of:
receiving point cloud data in a three-dimensional (3D) space from an airborne platform;
reformatting the point cloud data from the 3D space into a two-dimensional (2D) space to form a 2D signal;
decomposing the 2D signal using a wavelet transform (WT) to form a decomposed WT signal;
reconstructing the decomposed WT signal to form a low-pass filtered profile; and
classifying the low-pass filtered profile as the terrain profile;
including the steps of:
attenuating high frequency components of the point cloud data in the 3D space to form a filtered height signal;
defining the low-pass filtered profile as a ground reference signal; and
calculating a distance between a point on the filtered height signal and a corresponding point on the ground reference signal to determine whether the point on the filtered height signal belongs to a ground class or an object class.

17. The method of claim 16 wherein the object class includes man-made objects or vegetation, and
the ground class includes natural terrain.

18. The method of claim 16 wherein a a predetermined threshold value is used in determining whether a point belongs to the ground class or the object class.

* * * * *